United States Patent [19]

de Carbon

[11] Patent Number: 4,899,855
[45] Date of Patent: Feb. 13, 1990

[54] PISTON ASSEMBLY HAVING AN OUTER SKIRT AND A SPACED INNER CORE

[76] Inventor: Christian B. de Carbon, 64 Boulevard Maurice Barrés, 92200 Neuilly-sur-Seine, France

[21] Appl. No.: 165,075

[22] Filed: Mar. 7, 1988

[30] Foreign Application Priority Data

Mar. 6, 1987 [FR] France .................................. 87 03113

[51] Int. Cl.[4] .......................... F16F 9/34; F16K 16/00; F16K 17/26
[52] U.S. Cl. ............................. 188/322.15; 137/493.8; 188/322.22; 251/333
[58] Field of Search ........... 188/311, 316, 317, 322.13, 188/322.15, 322.22; 137/493.8; 92/181 R, 181 P, 184; 251/333

[56] References Cited

U.S. PATENT DOCUMENTS

| | | | |
|---|---|---|---|
| 3,003,596 | 10/1961 | de Carbon | 188/322.22 X |
| 3,088,556 | 5/1963 | de Carbon | 188/317 |
| 3,365,191 | 1/1968 | Ellis, Jr. et al. | 188/322.13 X |
| 3,837,445 | 9/1974 | Pierle | 188/322.15 |
| 3,844,389 | 10/1974 | de Carbon | 137/493.8 X |
| 4,512,447 | 4/1985 | Miura | 188/322.15 |

FOREIGN PATENT DOCUMENTS 0143838 11/1981 Japan .............................. 188/322.15

Primary Examiner—Robert J. Oberleitner
Attorney, Agent, or Firm—Watson, Cole, Grindle & Watson

[57] ABSTRACT

The assembly, mounted on a piston rod, is constructed as a piston body (1) having a cylindrical skirt and oil passages (4a) between the skirt and a cylindrical core (3) for fastening to the piston rod, and a double-acting floating valve in the form of an annular plate mounted with a specific prestress between a bearing zone (8) of the cylindrical skirt of the piston body (1) on the outside and a bearing member on the inside. The outer part of the bearing zone of the cylindrical skirt is cut in such a way that the bearing surface (8) is different from a surface contained between two circles concentric relative to the axis of the piston body (1), for example delimited by a polygon with concave sides (19), so that the change from laminar flow to turbulent flow during a rapid compression movement does not take place simultaneously over the entire circumference of the divergent oil stream.

15 Claims, 3 Drawing Sheets

PISTON ASSEMBLY HAVING AN OUTER SKIRT AND A SPACED INNER CORE

The subject of the present invention is a piston assembly for a hydraulic shock absorber, especially of the single-tube type, which is intended to be mounted on the end of a piston rod and which can advantageously be used in motor vehicles.

The French Pat. Nos. 1,542,408 and 2,146,611 of the present inventor describe a shock-absorber piston, the essential characteristic of which is to ensure the braking of the piston in both directions of movement by means of one and the same valve.

In this known piston, the body of the piston consists of a cylindrical skirt connected to a cylindrical core by means of spokes, between which oil passages are defined. The valve which alone ensures that the shock absorber is braked in both directions is in the form of an annular spring-steel plate which, at rest, is held with slight prestress (of the order of a tenth of a millimeter) between two concentric seats. For this purpose, the inner edge of the valve formed by the abovementioned annular plate bears on a circular plate held on the piston rod, its outer edge bearing on the piston skirt.

In French Pat. No. 2,146,611, there is also a washer for centering the annular plate forming the valve and which bears on a bearing washer having an outside diameter greater than that of the centering washer. The installation prestress is provided automatically if the centering washer has a thickness slightly less than that of the annular plate forming the valve, when the base of the cylindrical core is in the same plane as the base of the cylindrical skirt of the piston body.

The mode of operation is as follows: under compression, the valve formed by the annular plate and bearing on the bearing washer is deformed into a cone, thereby exposing, near its outer circumference, a circular orifice through which the oil escapes, the total cross-section of this passage being proportional to the deflection of the valve. Under expansion, the valve, bearing near its outer periphery on the cylindrical skirt of the piston body, is deformed into a cone (without a reversal of the direction of conical deformation), thus exposing near its bore passages which open into indentations distributed over the outer circumference of the centering washer, the outside diameter of which is only a few hundredths of a millimeter less than the bore in the annular plate forming the valve.

At the start of the expansion movement, the cross-section of the exposed passage increases slowly in proportion to the product of the deflection and according to the width of the indentations of the centering washer. Then, when the expansion rate becomes sufficient, the deflection of the valve exceeds the thickness of the centering washer, then exposing a much larger passage when the valve deflection increases.

In order to have a permanent small passage, even before any deflection of the valve, indentations similar to those of the centering washer can be provided in the bearing washer and arranged opposite the first.

The assembly composed of the indented centering washer and of the indented bearing washer is itself supported by a flat spacer washer having a diameter equal to the bore in the annular plate forming the valve. This spacer washer retained on the piston rod bears itself on a thicker retaining washer or disc of larger diameter.

This results, by very simple means, in a decreasing curve highly favorable to the comfort of the motor vehicle equipped with such a shock absorber, and having a form which, in other pistons can be obtained only with a much more complicated set of valves.

It is worthy of note that, when the deflection of the valve exceeds the thickness of the centering washer, the valve, since it is then no longer centered by the said washer, could risk coming off center laterally. But a detailed analysis of the hydrodynamic forces exerted on the valve shows that there is no risk of a lateral shift of the valve because it is then centered automatically and perfectly as a result of the substantial hydrodynamic forces.

Because of the small number of components controlling the functioning, such a piston is useful in that it is very cheap. It also provides a remarkable uniformity of results in larger series. However, its greatest advantage is that it makes it possible to combine very high comfort with excellent road-holding of the vehicle equipped with the shock absorber.

A thorough study of the properties of such a piston shows virtually perfect functioning during the expansion movement, but this is not true of the rapid compression movements which, under certain conditions, reveal defects arising because control is exerted on divergent flows of liquid, whereas in the expansion movement it is exerted on convergent flows.

These defects are of two kinds: first of all, a much faster change from laminar flow to turbulent flow, this being detrimental to the quality of running, and secondly, on some vehicles, the occurrence of whistling which is difficult to prevent.

To mitigate these faults, the solution hitherto has involved either using a valve of an outside diameter exceeding the bore of the cylindrical piston skirt only very slightly or cutting back the outside of the skirt so that the bearing surface of the valve on the skirt is as small as possible.

However, neither of these two solutions makes it possible to prevent whistling during the compression movement on some particularly sensitive vehicles.

The subject of the present invention is various improvements to this type of piston.

Thus, the object of the present invention is to provide an effective remedy for the whistling and substantially reduce the disadvantages arising from the change from laminar flow to turbulent flow.

One object of the invention is, in particular, to make the change from laminar flow to turbulent flow progressive during a compression movement.

Another object of the present invention is to delay the change from laminar flow to turbulent flow.

The piston assembly for a hydraulic shock absorber, especially of the single-tube type, intended to be mounted on the end of a piston rod, according to the invention, comprises a piston body having a cylindrical skirt and oil passages between the said skirt and a cylindrical core for fastening to the piston rod; a doubleacting floating valve in the form of at least one annular plate mounted with a specific prestress between a bearing zone of the cylindrical skirt of the piston body on the outside and a bearing means on the inside. According to the invention, the outer bearing zone has means ensuring that the change from laminar flow to turbulent flow does not take place simultaneously over the entire circumference.

In a preferred embodiment, the outer bearing zone of the cylindrical skirt has at least one bearing region located at a certain radial distance from the axis of the piston body and at least one other bearing region located at a different radial distance from the same axis.

In a preferred embodiment of the invention, the outer part of the bearing zone of the cylindrical skirt is cut in such a way that the bearing surface is different from a surface contained between two circles concentric relative to the axis of the piston body. The bearing surface can advantageously be delimited, on its outside, by a polygon having straight or preferably concave sides and which is centered on the axis of the piston body. In another embodiment, the bearing surface can be delimited, on its outside, by a circle off-center relative to the axis of the piston body.

At all events, such a structure of the outer bearing zone of the annular plate forming the valve makes it possible to prevent the change from laminar flow to turbulent flow from taking place simultaneously over the entire circumference, as occurred in the devices of the prior art. Experience shows that the result of such a design is that it eliminates the whistling which it was impossible to prevent in the preceding solutions, and that, furthermore, it improves the smoothness of the running of the vehicle equipped with such a shock absorber. It can be estimated that, with the preceding solutions, because of the circular symmetry, the change from laminar flow to turbulent flow takes place at the same moment, hence somewhat abruptly, at all the points on the circumference. With the new structure recommended according to the present invention, this no longer occurs, the change from laminar flow to turbulent flow taking place progressively and no longer the same moment at all the points on the circumference.

According to another aspect of the present invention, when the piston assembly comprises a bearing washer located on the inside and provided with a plurality of indentations distributed over its outer circumference, a washer for centering the annular plate, interacting with the bore of the latter and provided with a plurality of indentations distributed over its outer circumference, and a retaining disc, the retaining disc has at least one projecting stud capable of entering a corresponding receptacle in the cylindrical core of the piston body and of passing through corresponding perforations made in the bearing washer and in the centering washer, so as to orient the bearing washer and the centering washer relative to one another, whilst keeping their respective indentations opposite one another, and orient the said washers relative to the piston body.

The projecting studs can be formed simply by embossing or by any other means.

As a result of this arrangement which allows perfect centering of the bearing washer and the centering washer relative to the oil passages of the piston body, it is possible to delay the change from laminar flow to turbulent flow.

The present invention will be understood better from a study of a few embodiments described in a non-limiting way and illustrated in the accompanying drawings in which.

Figure 1:
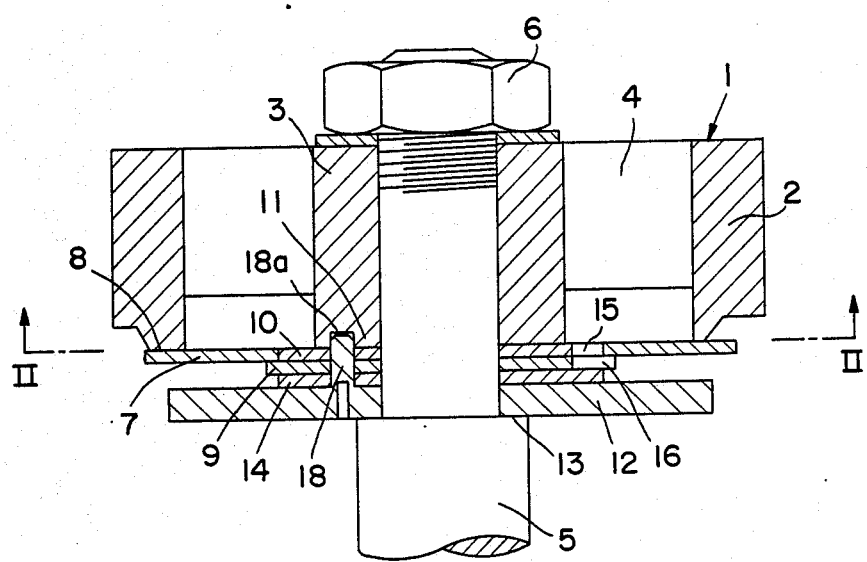
FIG. 1 is a diagrammatic sectional view of a piston assembly according to the invention, the section through the piston body being taken along the line I—I of FIG. 2.
Figure 2:
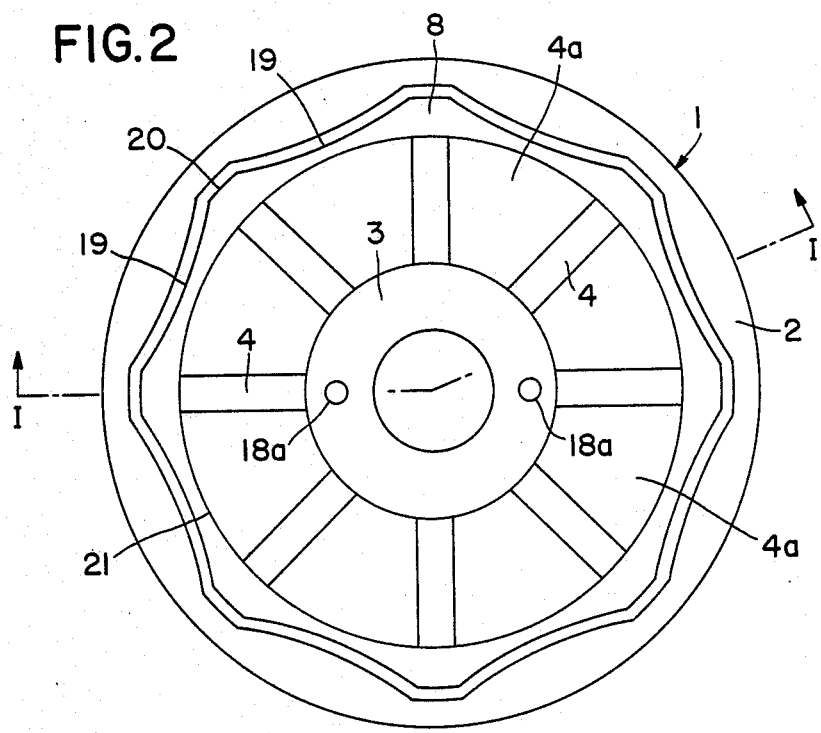
FIG. 2 is a bottom view of the piston body along the line II—II of FIG. 1, showing in particular the design of the outer bearing zone of the cylindrical skirt.

As illustrated in FIGS. 1 and 2 where the thicknesses of some components have been increased to make understanding easier, the piston assembly according to the invention comprises a piston body, generally designated 1, comprising a cylindrical skirt 2 connected to a central cylindrical core 3 by means of spokes 4, of which there are eight in the example illustrated and which thus define between them oil passages 4a (FIG. 2) through the piston body 1. It will, of course, be appreciated that there could be a different number of spokes 4 which do not extend as far as the base surface of the cylindrical core 3. The piston body 1 is shown on the end of the piston rod 5 which passes through the cylindrical core 3 and which is fastened to the piston body by a nut 6.

The valve which alone ensures the braking of the shock absorber in both directions and which is the only movable component of the piston assembly is in the form of an annular spring-steel plate 7. It would also be possible to use more than one annular plate to form the valve by stacking. The annular plate 7 bears, on the outside, on a bearing zone or surface 8 of the cylindrical skirt 2 and, on the inside, on a bearing washer 9 held on the rod 5. The annular plate 7 thus forms a double-acting floating valve which, at rest, is held with a slight prestress of the order of one tenth of a millimeter between two concentric seats.

At rest, the annular plate 7 is centered by means of a centering washer 10 held on the piston rod 5 and interacting with the bore of the annular plate 7. The outside diameter of the centering washer 10 is only a few hundredths of a millimeter less than the bore of the plate 7. The outside diameter of the bearing washer 9 is slightly greater than that of the centering washer 10, so as to ensure a peripheral support for the inner part of the annular plate 7 adjacent to its bore. The installation prestress of the annular plate 7 forming the valve is provided automatically because the centering washer 10 has a thickness slightly less than that of the annular plate 7 and because the front base surface 11 of the cylindrical core 3 is in the same plane as the bearing zone 8 of the cylindrical skirt 2.

The piston assembly illustrated also has a retaining disc 12 held on the piston rod 5 and bearing on the latter by means of a shoulder 13. The retaining disc 12 is formed by a washer thicker than the preceding ones and of larger diameter. The diameter of the retaining disc is preferably such that its periphery is substantially opposite the bearing zone 8 of the cylindrical skirt 2. A spacer washer 14 held on the piston rod 5 is also mounted between the bearing washer 9 and the retaining disc 12. The outside diameter of the spacer washer 14 is substantially equal to the diameter of the bore of the annular plate 7.

Figure 5:
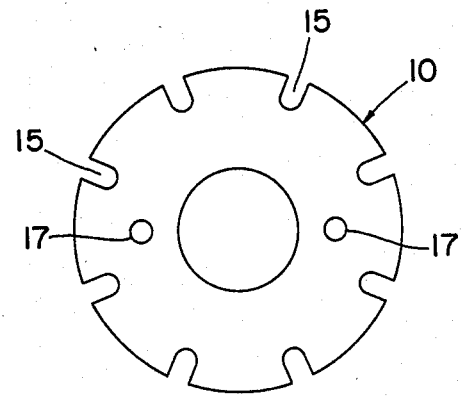
FIG. 5 shows a plan view of the structure of the indented centering washer used in the assembly of FIG. 1, the indented bearing washer having an identical structure, with the exception of its outside diameter.

The centering washer 10 illustrated in plan view in FIG. 5 has a plurality of indentations 15 distributed over its outer circumference. In the example shown, there are eight of these indentations, each corresponding to one of the passages 4a. The bearing washer 9 likewise has a plurality of indentations 16 of a form similar to that of the indentations 15 and distributed over the outer circumference. In the example illustrated, there are likewise eight of the indentations 16 and these are in registry with the indentations 15.

As shown in FIG. 1, the assembly is mounted by stacking on the piston rod 5 the retaining disc 12, the spacer washer 14, the bearing washer 9, the centering washer 10 together with the annular plate 7, and the piston body 1, the unit as a whole being clamped by means of the nut 6.

According to the invention, this stack is also oriented in a specific way by means of two projecting studs 18 which are integral with the retaining disc 12 and are obtained simply by embossing and which are capable of passing through corresponding perforations made respectively in the spacer washer 14, the bearing washer 9 and the centering washer 10. FIG. 5 shows the two perforations 17 in the centering washer 10 which are arranged diametrically opposite one another. The studs 18 can also partially enter two receptacles 18a made in the cylindrical core 3 of the piston body 1. The above-mentioned perforations and the receptacles 18a are arranged in such a way that the indentations 15 and 16 are in registry with one another, as shown in FIG. 1, and are also in registry with the oil passages 4a in the piston body 1.

Although two projecting studs have been used in the example illustrated, it will of course be appreciated that a different number of projecting studs would be perfectly possible.

Referring to FIG. 2, it will be seen that the outer part of the bearing face of the cylindrical skirt 2 is cut out in such a way that the bearing surface 8 is delimited towards the outside by the geometrical figure similar to an octagon having joined concave surface segments on sides 19 and centered on the axis of the piston body 1. In the example shown in FIG. 2, the zones of the vertices of this octagon are portions or segments of an arc of a circle 20 which are in registry with the spokes 4. The bearing surface 8 is delimited, towards the inside, by the bore 21 of the cylindrical skirt 2 and, towards the outside, by the geometrical figure defined by the succession of the circular arcs of vertices 20 and by the concave sides 19. The bearing surface 8 thus has a reduced and continually varying thickness at the location of each of the oil passages 4a, in the zone where the concave sides 19 are closest to the bore 21, and a maximum thickness in registry with the spokes 4 in the zones of the vertices of the polygon which are delimited by the circular portions 20. The modifications in the radial dimensions of the bearing surface 8 ensure that the change from laminar flow to turbulent flow takes place progressively and no longer at the same moment at all the points on the circumference. Although a concave form of the sides 19 has been illustrated here, it will be appreciated that a convex form would also be possible.

Figure 3:
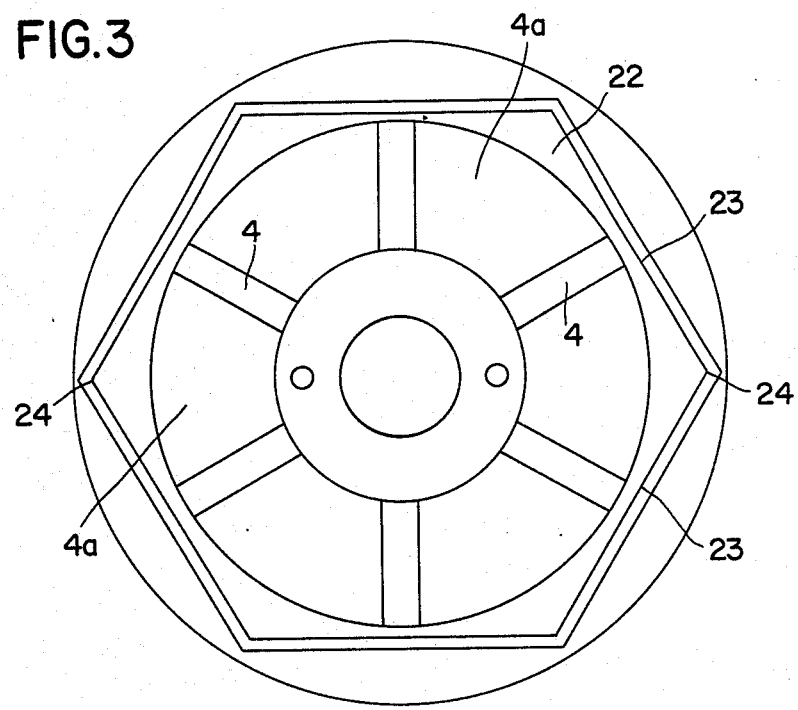
FIG. 3 is a view similar to that of FIG. 2, showing an alternative hexagonal design of the outer bearing zone.
Figure 4:
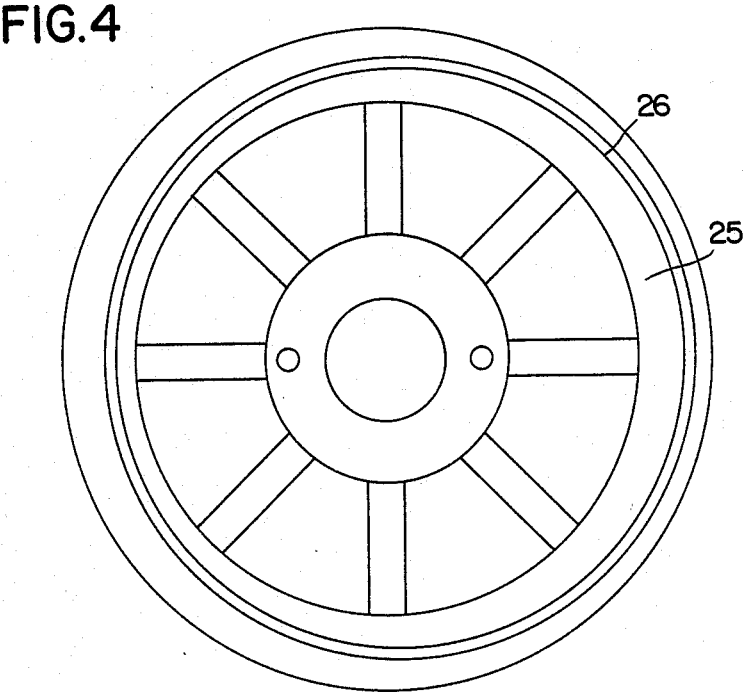
FIG. 4 is another alternative version of FIG. 2, showing an off-center circular design of the outer bearing zone.

The alternative versions shown in FIGS. 3 and 4 illustrate bearing surfaces of different form.

FIG. 3, where identical parts bear the same reference numerals, illustrates by way of example a bearing surface 22 delimited, on the outside, by a regular hexagon with straight sides 23. In contrast to the example illustrated in FIG. 2 where the spokes 4 were in registry with the vertices 20 of the polygon, in the alternative version of FIG. 3 the piston body has six passages 4a at the sides 23, at the location of the zones of minimum radial dimension of the bearing surface 22. It would, of course, also be possible to orient the spokes 4 in registry with the six vertices 24 of the hexagon.

For each of the embodiments, the permanent oil passages defined by the mutually opposite indentations 15 and 16 are of a number and an orientation which make it possible for all of them to be either in registry with an oil passage 4a, as shown in FIG. 1, or under a spoke 4, in order to ensure the symmetry of the flow.

In the alternative version of FIG. 4, the bearing surface 25 is delimited, on the outside, by a circle 26 off-center relative to the axis of the piston body. Here again, there is therefore an asymmetry making it possible to ensure that the change from laminar flow to turbulent flow does not take place simultaneously over the entire circumference.

The assembly according to the invention, as illustrated in FIG. 1, functions in the following manner when it is mounted on a shock absorber: under compression, the annular plate 7, bearing on the bearing washer 9, exposes at the location of the bearing surface 8 a circular orifice through which the oil escapes, the total cross-section of this passage being proportional to the deflection of the plate 7. Under expansion, the plate 7, bearing on the bearing surface 8, is deformed into a cone in the same direction as before, exposing in the region of its bore passages which open into the indentations 15. At the start of the expansion movement, the cross-section of the exposed passage increases slowly in proportion to the product of the deflection and the width of the indentations 15. Then, when the expansion rate becomes sufficient, the deflection of the plate 7 exceeds the thickness of the centering washer 10, then exposing a much larger passage when the deflection of the plate 7 increases.

The indentations 16, in interaction with the spacer washer 14, ensure a small permanent oil passage even before any deflection of the plate 7.

As a result of the present invention, the flow of the divergent stream of liquid does not change simultaneously over the entire circumference from the laminar state to the turbulent state during a rapid compression movement, thus making it possible to prevent the faults mentioned previously.

Moreover, the perfect centering obtained on the one hand between the various indentations 15 and 16 and on the other hand between these indentations as a whole and the oil passages 4a makes it possible to delay the change from the laminar state to the turbulent state.

It will be seen that this centering could be obtained by other means. In particular, the studs 18 could be replaced by simple perforations made in the retaining disc 12. A centering rod introduced through such a perforation in the disc 12, through the perforations, such as 17, in the various washers 14, 9 and 10 and into a receptacle 18a would then make it possible to center the various components during the mounting of the assembly. After the mounting and the removal of the rod, this centering would then be maintained simply by clamping the stack by means of the nut 6.

I claim:

1. A hydraulic shock absorber having a reciprocable piston assembly mounted at the end of a piston rod and comprising:
   a piston body having a generally cylindrical outer skirt and a generally cylindrical inner core, said core being provided with a central bore adapted for mounting said piston body on said end of the piston rod, a plurality of means in said piston body for integrally joining said inner core to said outer skirt and defining between each other, a plurality of passages for hydraulic fluid through said piston body;

a flat annular bearing washer mounted on said end of the piston rod between said piston body and a shoulder of said piston rod and having an outer diameter greater than the outer diameter of said inner core;

means defining a double-acting floating valve comprising at least one flat annular disk mounted with a given prestress, the outer position of said valve being adapted to bear against a circumferential bearing surface of said outer skirt and the inner portion of said valve being adapted to bear upon an outer portion of said bearing washer;

a flat centering annular washer mounted on said end of the piston rod between said piston body and said bearing washer, surrounded by said annular disk of the floating valve, said centering washer having an outer diameter less than the outer diameter of said bearing washer; and said bearing surface comprising a plurality of bearing portions located substantially in registry with each of said hydraulic fluid passages in said piston body, each of said bearing portions in registry with each of said passages having unequal radial dimensions relative to the corresponding hydraulic fluid passage and providing a valve seat for the outer portion of the floating valve.

2. The shock absorber according to claim 1, wherein said bearing washer and said centering washer each have a plurality of indentations at the outer peripheries thereof respectively in registry with one another, and means for maintaining the registry of said respective indentations relative to said piston body, said registry means comprising perforations in said washers and a receptacle in said piston body, and centering means extending through said perforations and into said receptacle.

3. The shock absorber according to claim 2, further comprising a retaining disk mounted on said shoulder, said centering means extending from said retaining disk.

4. The shock absorber according to claim 1, wherein said bearing surface has an outer circular surface eccentric to said rod and an inner circular surface coaxial with said rod, said bearing surface between said circular surfaces defining said bearing portions.

5. The shock absorber according to claim 1, wherein said bearing surface is coplanar with a surface of said core facing said centering washer.

6. The shock absorber according to claim 1, further comprising a retaining disk mounted on said end of said piston rod between said bearing washer and said shoulder, said retaining disk having an outer diameter such that the periphery thereof lies opposite at least a portion of said bearing surface.

7. The shock absorber according to claim 6, further comprising a spacer washer mounted on said end of said piston rod between said bearing washer and said retaining disk, said spacer washer having an outer diameter substantially equal to an inner diameter of said centering washer.

8. A piston assembly adapted to be mounted at the end of a piston rod of a hydraulic shock absorber, comprising:

a piston body having a first and a second opposing circumferential surfaces said second surface facing said piston rod, and a plurality of hydraulic fluid passage in said piston body extending between said surfaces;

a flat annular bearing washer mounted on said end of the piston rod between said piston body and a shoulder of said piston rod;

means defining a double-acting floating valve comprising at least one flat annular disk mounted with a given prestress, the outer portion of said valve being adapted to bear against said second surface of the piston body and the inner portion of said valve being adapted to bear upon an outer portion of said bearing washer;

a flat centering annular washer mounted on said end of the piston rod between said piston body and said bearing washer surrounded by said annular disk of the floating valve, said centering washer having an outer diameter less than the outer diameter of said bearing washer; and said second surface of the piston body having a plurality of bearing portions located substantially in registry with each of said hydraulic fluid passages in said piston body, each of said bearing portions in registry with each of said passages relative to the corresponding hydraulic fluid passage and being adapted for cooperating with said outer portion of the floating valve to define therebetween a flow of hydraulic fluid changing progressively from laminar to turbulent flow at different moments, at all points along the circumference of said second surface.

9. The assembly according to claim 8, wherein said second surface has an outer substantially polygonal surface and an inner circular surface, said second surface between said inner and outer surfaces defining said bearing portions, and said polygonal surface being coaxial with said piston body.

10. The assembly according to claim 9, wherein said polygonal surface comprises a plurality of joined concave surface segments respectively in registry with said fluid passages.

11. The assembly according to claim 10, wherein said piston body has means for defining said passages, said polygonal surface further comprising a plurality of arcuate surface segments at which said concave segments are joined, said arcuate segments being respectively in registry with said passage defining means.

12. The assembly according to claim 9, wherein said polygonal surface comprises a plurality of joined arcuate surface segments respectively in registry with said fluid passages.

13. The assembly according to claim 8, wherein said second surface has an outer circular surface eccentric to said rod and an inner circular surface coaxial with said rod, said second surface between said circular surfaces defining said bearing portions. further comprising a retaining disk mounted on said end of said piston rod between said bearing washer and said shoulder, said retaining disk having an outer diameter such that the periphery thereof lies opposite at least a portion of said bearing surface.

14. The assembly according to claim 8, further comprising a retaining disk mounted on said end of said piston rod between said bearing washer and said shoulder, said retaining disk having an outer diameter such that the periphery thereof lies opposite at least a portion of said second surface.

15. The assembly according to claim 14, further comprising a spacer washer mounted on said end of said piston rod between said bearing washer and said retaining disk, said spacer washer having an outer diameter substantially equal to an inner diameter of said centering washer.

* * * * *